Oct. 11, 1960  O. C. OLSEN  2,955,493
RIVET ANVIL FOR FIELD MOWER SICKLE
Filed Aug. 26, 1958

Inventor:
Oliver C. Olsen,
By Schroeder, Hofgren,
Brady & Wegner, Attys.

United States Patent Office 2,955,493
Patented Oct. 11, 1960

2,955,493
RIVET ANVIL FOR FIELD MOWER SICKLE

Oliver C. Olsen, Excelsior, Minn.
(P.O. Box 31, Wayzata, Minn.)

Filed Aug. 26, 1958, Ser. No. 757,378

3 Claims. (Cl. 78—3)

This invention relates to a rivet anvil for a field mower sickle, and in particular it relates to an anvil by means of which a new sickle section may be riveted to the sickle bar in the field.

The principal object of the present invention is to provide a simple, rugged anvil which may be used to set the river of a new sickle section of a field mower without removing the sickle bar from the mower.

Another object of the invention is to provide an anvil which may be suspended from the guards of a mower so as to permit the person using the anvil to have both hands free for handling sickle sections and rivets.

Another object of the invention is to provide an anvil which may be suspended from the forwardly extending guards on the mower cutter bar, and which is so arranged as to require no auxiliary support.

Yet another object of the invention is to provide an anvil member which is of sufficient weight, and is so balanced that the setting of a rivet on a rivet post of the anvil may be accomplished with the anvil suspended from the forwardly extending guards.

Yet another object of the invention is to provide an anvil with an adjustable hanger which adapts it to use with mowers of different sizes and having guards of different sizes and shapes.

Yet another object of the invention is to provide an anvil which may be used for riveting sickle sections on field mowers, windrowers and combines. In order to simplify the present application, the term "mower" is used herein as a generic term to include all three devices.

The invention is illustrated in a preferred embodiment in the accompanying drawings in which.

Figure 1:
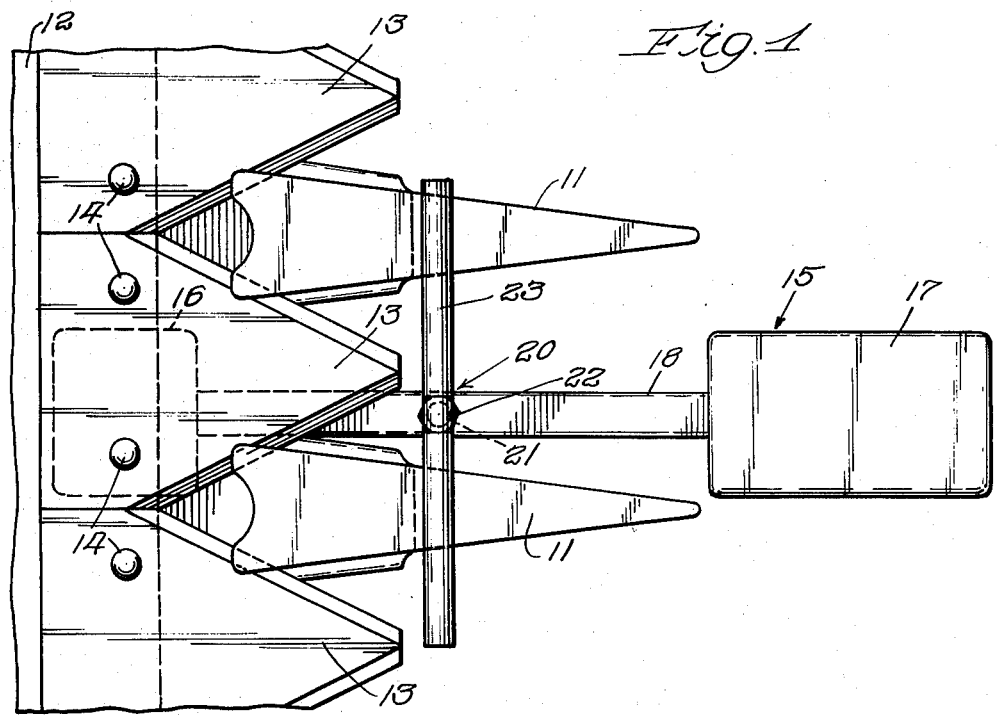
Fig. 1 is a fragmentary, top plan view of a mower cutter bar with the anvil of the present invention mounted thereon.
Figure 2:
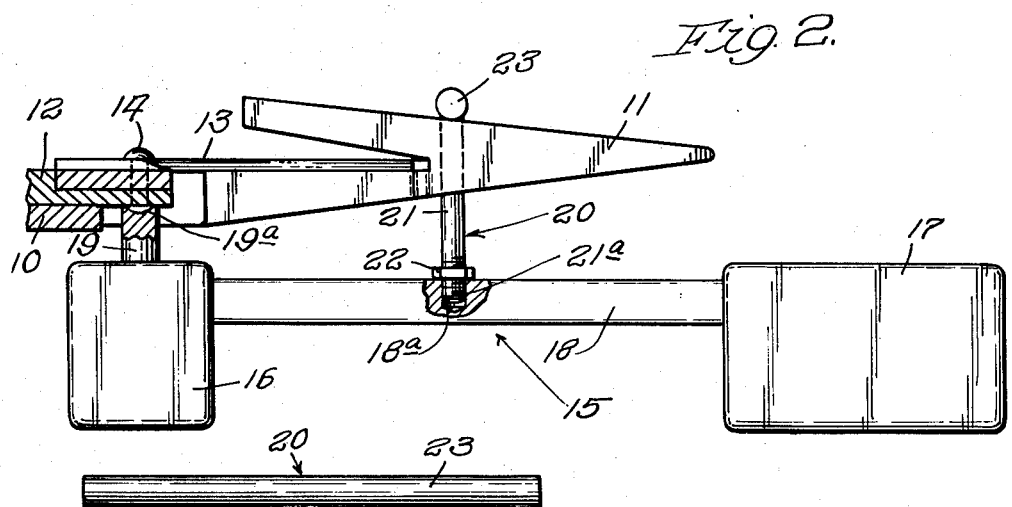
Fig. 2 is a side elevational view of the anvil, partly in section, seen as suspended upon the mower cutter bar guards for use in setting a rivet.
Figure 3:
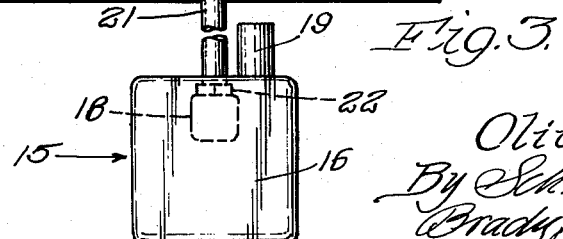
Fig. 3 is an end elevational view of the anvil separate from the mower on which it is used.

Referring to the drawings in greater detail, a mower cutter bar 10 having forwardly extending guards 11 is provided with a sickle bar 12 on which sickle sections 13 are secured by means of rivets 14. The present invention consists of an anvil, indicated generally at 15, which may be suspended from the forwardly extending guards 11 and used in setting the rivets 14 when it is necessary to replace a broken or damaged sickle section 13.

The anvil of the present invention includes an anvil head 16 and a counterweight 17 which are connected by an integral carrying handle 18. Surmounting anvil head 16 is an upstanding rivet post 19 at the upper end of which is a concave rivet seat 19a. Mounted on carrying handle 18 is a hanger bar 20, consisting of an upstanding spacer bar 21 the lower end of which is provided with a screw thread 21a to screw into a threaded bore 18a in handle member 18. The depth of bore 18a permits about an inch of adjustment of the height of spacer bar 21, which may be locked in place by a lock nut 22. Surmounting spacer bar 21 is a cross bar 23 which is long enough to overlie two adjacent guards 11 of the mower cutter bar.

It is seen that anvil head 16 is considerably smaller than counterbalance 17, and that hanger member 20 is positioned so that the weight of counterweight 17 presses anvil head 16 upwardly in order to hold rivet post 19 firmly against a rivet 14 in a sickle section 13. The weight of the entire anvil 15, and the way in which it is balanced with respect to its hanger member 20, permits it to be used for setting a rivet with no support for the anvil other than the hanger member 20. Thus, a person who is securing a new sickle section to sickle bar 12 may have both hands free to handle the sickle section and rivets, instead of being required also to support the anvil head 16 beneath the cutter bar. Likewise, the fact that the anvil member may be used by suspending it from the guards 11 permits rivets to be set in the field without removing the sickle bar 12 from the cutter bar, as is essential if an anvil is supported upon a bench or on the ground.

The foregoing detailed description is given for clearness of understanding only and no unnecessary limitations are to be understood therefrom, as modifications will be obvious to those skilled in the art.

I claim:

1. An anvil for riveting sickles to a sickle bar on a mower having a cutter bar with forwardly extending guards, said anvil comprising: an anvil head adapted to underlie a sickle bar; an upstanding rivet post on said anvil head; elongated, integral counterweight means at one side of the anvil head and adapted to extend forward between two guards; and a hanger member for suspending the anvil from two adjacent guards of a mower, the weight of the anvil and the position of said hanger member being such that the counterweight presses the anvil head upwardly to hold the rivet post against the sickle bar with sufficient force that a rivet may be set on said post with the anvil supported solely by said hanger member.

2. The device of claim 1 in which the hanger member comprises an upstanding spacer bar surmounted by a cross bar, and means is provided to adjust the height of said spacer bar.

3. The device of claim 1 in which the hanger member comprise an upstanding spacer bar surmounted by a cross bar.

References Cited in the file of this patent

UNITED STATES PATENTS

| | | |
|---|---|---|
| 1,057,384 | Pacher | Mar. 25, 1913 |
| 2,263,283 | Becker | Nov. 18, 1941 |